United States Patent [19]
Parikh et al.

[11] Patent Number: 5,772,156
[45] Date of Patent: Jun. 30, 1998

[54] AIRCRAFT BOUNDARY LAYER CONTROL SYSTEM WITH DISCHARGE TRANSPIRATION PANEL

[75] Inventors: Pradip G. Parikh, Renton; Frank D. Neumann, Bellevue, both of Wash.

[73] Assignee: The Boeing Company, Seattle, Wash.

[21] Appl. No.: 566,584

[22] Filed: Nov. 30, 1995

[51] Int. Cl.$^6$ .................................................. B64C 21/06
[52] U.S. Cl. ...................... 244/209; 244/207; 244/208; 244/130
[58] Field of Search .................................. 244/200, 207, 244/208, 209, 204, 130

[56] References Cited

U.S. PATENT DOCUMENTS

| | | | |
|---|---|---|---|
| 2,742,247 | 4/1956 | Lachmann | 244/209 |
| 2,873,931 | 2/1959 | Fleischmann . | |
| 3,085,740 | 4/1963 | Wagner . | |
| 3,128,973 | 4/1964 | Dannenberg | 244/209 |
| 3,194,518 | 7/1965 | Walsh | 244/207 |
| 3,261,576 | 7/1966 | Valyi | 244/209 |
| 3,692,259 | 9/1972 | Yuan | 244/199 |
| 3,933,327 | 1/1976 | Cook et al. | 244/207 |
| 4,008,866 | 2/1977 | Rethorst . | |
| 4,664,345 | 5/1987 | Lurz | 244/208 |

FOREIGN PATENT DOCUMENTS

| | | | |
|---|---|---|---|
| 593661 | 2/1934 | Germany | 244/209 |

*Primary Examiner*—Andres Kashnikow
*Assistant Examiner*—Tien Dinh
*Attorney, Agent, or Firm*—Christensen O'Connor Johnson & Kindness PLLC

[57] ABSTRACT

An improvement to boundary layer control system, including a transpiration panel (58) for transpiring suction air in a distributed manner, is provided. The transpiration panel (58) replaces the discharge nozzle of prior art flow control systems. The transpiration panel (58) is generally a rigid panel having a plurality of small holes (62) extending from an inner panel surface (56) to a smooth outer panel surface (54). The transpiration panel (58) is positioned flush with an external aircraft surface in a region where laminar flow control is not being attempted. Exemplary subsonic and supersonic boundary layer control systems including the transpiration panel (58) are provided. A preferred location of the transpiration panel (58) for the subsonic application is the underside of a wing (80), near the leading edge. A preferred location of the transpiration panel (58) for the supersonic application including on the upper surface of a wing (114) near the fuselage (118), in a turbulent wedge region.

20 Claims, 3 Drawing Sheets

U.S. Patent    Jun. 30, 1998    Sheet 1 of 3    5,772,156
*Fig. 1*
(PRIOR ART)
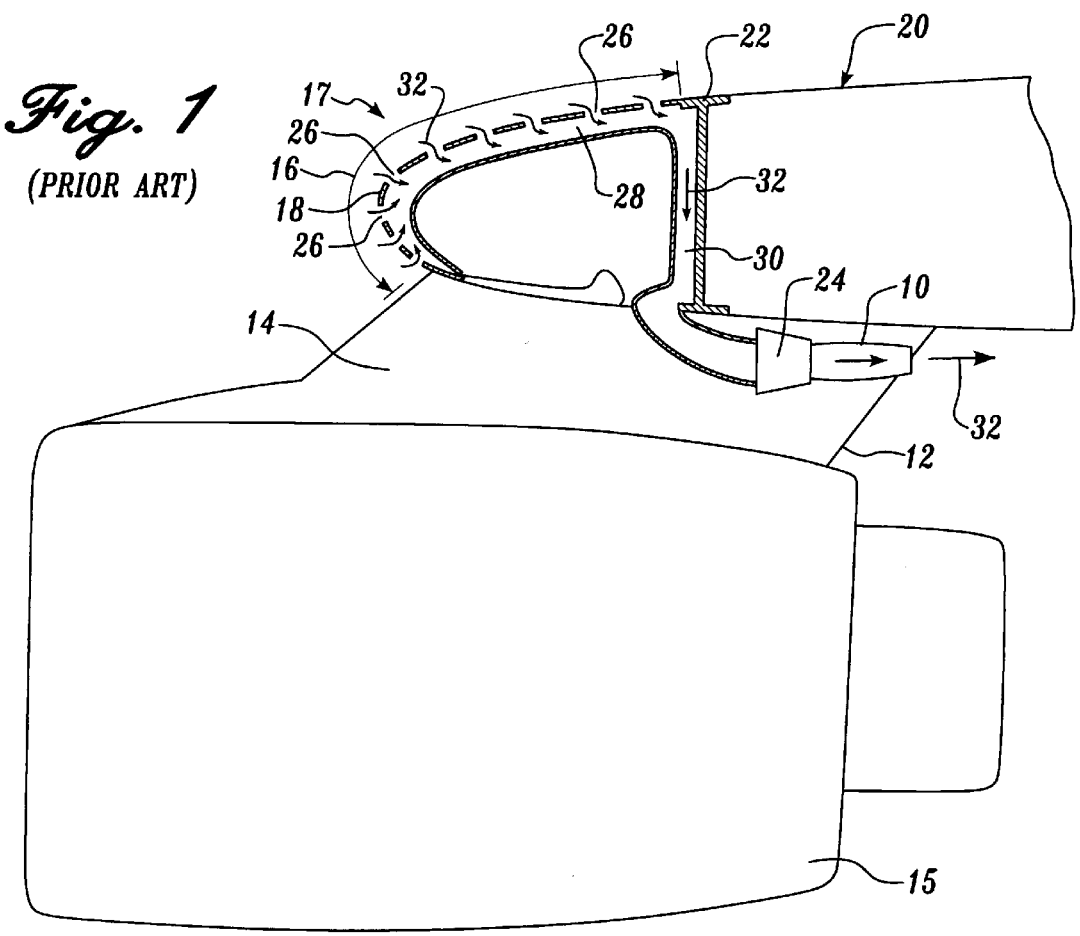
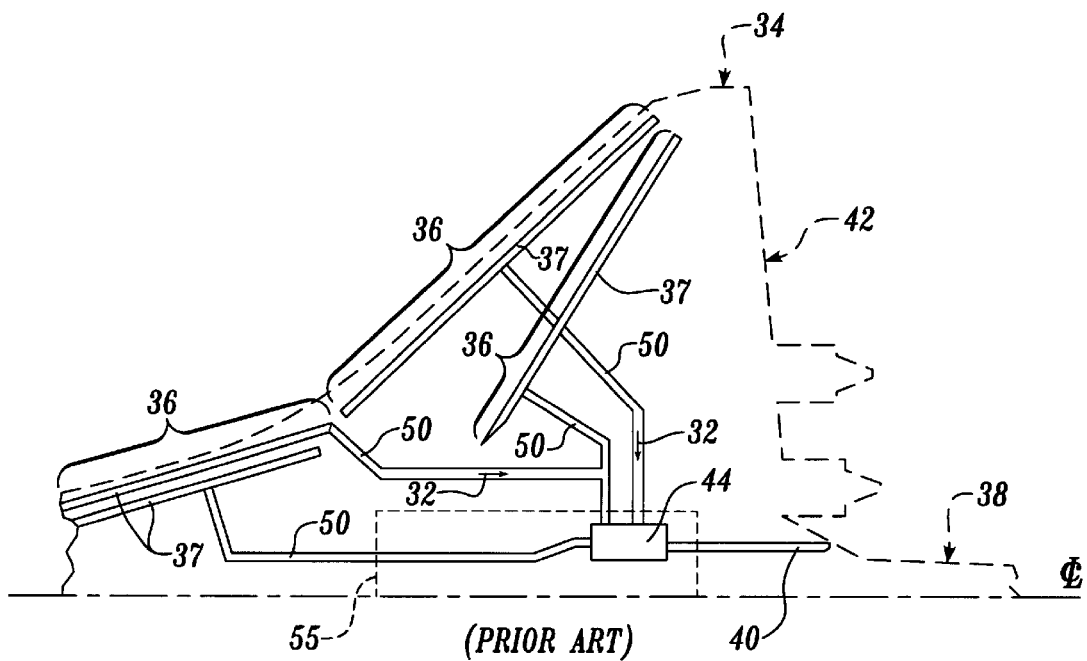
(PRIOR ART)
*Fig. 2*

AIRCRAFT BOUNDARY LAYER CONTROL SYSTEM WITH DISCHARGE TRANSPIRATION PANEL

FIELD OF THE INVENTION

The present invention relates to aircraft boundary layer control systems and, more specifically, to methods and apparatus for discharging suction air produced by aircraft boundary layer flow control systems.

BACKGROUND OF THE INVENTION

The major aerodynamic objectives of boundary layer control systems used on many aircraft include reducing drag, maximizing lift, and minimizing unsteady air flow. Several methods have been developed to meet these objectives. One system, suitable for use on both supersonic and subsonic aircraft, includes air suction holes located along portions of aerodynamic surfaces of the aircraft. The holes are usually located at the leading edge region of the wings of the aircraft, ahead of the front spar. Decelerated fluid particles from the boundary layer are sucked into the holes before the particles have a chance to interrupt the boundary layer flow by causing turbulence or flow separation. Depending on the precise application, the use of air suction can result in an increase in lift, an increase in the stability of the boundary layer, a decrease in drag, and/or an increase in an aerodynamic surface's lift-to-drag ratio.

In addition to the perforated suction surface created by the holes, typical air suction systems include a compressor, various internal ducts connecting the compressor with the suction surface, and a discharge nozzle. External air is drawn through the holes in the suction surface into the connecting ducts. Drawing external air through an aerodynamic surface brings the boundary layer closer to the aircraft, which improves air flow over the surface.

The compressor provides the sucking force that continuously draws air into the connecting ducts. The compressor compresses the suction air before it is discharged. Compression of the suction air is necessary to raise the pressure of the discharge air above the pressure of the ambient air at the discharge location. In addition, pressure losses are experienced by the suction air as it flows through the perforated suction surface skin and the connecting ducting. In this regard, the pressure of the ambient air at the suction surfaces is lower than the pressure of the ambient air at the discharge location. The compressor is typically located inside the airplane wing and may be powered by any one of several methods, including direct mechanical drive, electrical drive, pneumatic drive, or hydraulic drive.

After the compressor compresses the suction air, the pressurized air is discharged. The conventional method of discharging suction air is via the discharge nozzle. In subsonic aircraft, the discharge nozzle can be placed at various locations, including at the trailing edge of the nacelle strut, facing aft, as shown in FIG. 1. In supersonic aircraft, the discharge nozzle can be placed at the trailing edge of the wing near the fuselage, also facing aft, as shown in FIG. 2.

The use of a compressor and a discharge nozzle has various disadvantages. A first disadvantage is a potentially large compressor power requirement. More specifically, discharging suction air through a discharge nozzle creates a suction air discharge momentum drag at the point of discharge. From the standpoint of minimizing this momentum drag, it is advantageous to release the suction air from the discharge nozzle at a velocity approaching the free-stream velocity of the ambient air at the point of discharge. Unfortunately, in order to discharge suction air at velocities approaching free-stream velocity, a high compression ratio compressor is required, thus requiring a compressor that typically has a large power requirement.

The power required to drive a boundary layer air suction compressor is ultimately extracted from the engine, which results in a specific fuel consumption penalty. As will be appreciated by those skilled in the aircraft art, a study of the tradeoff between increased compressor power requirement and reduced suction air momentum drag produced by such air boundary layer control systems results in the conclusion that beyond a certain limit, the drag reduction benefits are outweighed by the fuel penalties associated with increased compressor power requirements. These high compression ratio compressors are additionally disadvantageous because those of adequate capacity are usually large, which undesirably increases aircraft weight and reduces available wing space for fuel.

A second disadvantage of prior art boundary layer control systems is primarily associated with supersonic aircraft applications. In supersonic aircraft, the relatively high compression ratio required to expel suction air at acceptable velocities significantly increases the temperature of the compressed air, necessitating that some system components be formed of high temperature materials and that component surfaces near fuel be thermally insulated for safety reasons. The situation is worsened if the suction system requires that a portion of the internal ducts pass through the craft's main spar box in order to reach a discharge nozzle at the trailing edge of a wing, because this results in a loss of fuel capacity as well as an increase in weight, since fuel is normally housed in the wing and spar box of an aircraft.

A third disadvantage stems from the shape of the discharge nozzle of prior art boundary layer control systems. Typically, the nozzle extends into a flow region, thereby altering the cross-sectional shape of the aircraft at those extension regions. In aircraft in which drag-due-to-volume is a design factor, the nozzle distorts the cross-sectional area away from the optimal Sears Haack body shape and introduces a drag-due-to-volume penalty.

Another problem associated with prior art discharge nozzles shapes is that they are usually tubular, with a blunt circular trailing edge. Because free stream air flow velocity is greater than the velocity of the discharged suction air (as discussed above), the free stream air flow at the nozzle is unable to turn the corner of the nozzle trailing edge. This causes a slight vacuum to form at the aft end of the discharge nozzle relative to the flow pressure, which acts as a source of drag. This drag force is termed nozzle base drag. If the nozzle walls are fairly thick, or the free stream velocity is much greater than the suction air discharge velocity, nozzle base drag can be significant.

The present invention seeks to reduce the foregoing disadvantages and produce a boundary layer control system having lower compressor size, weight, and power requirements; reduced internal duct and discharge nozzle weight, volume, and insulation requirements; and no drag-due-to-volume penalty nor discharge nozzle base drag.

SUMMARY OF THE INVENTION

In accordance with the present invention, an aircraft boundary layer flow control system including a transpiration panel for discharging suction air into a non-laminar flow control region of the aircraft is provided. The transpiration panel transpires suction air in a distributed manner. More specifically, the transpiration panel is a rigid panel having a plurality of small holes extending from an inner panel surface to a smooth outer panel surface. The smooth outer surface of the transpiration panel is generally positioned flush with an outer aerodynamic surface, as noted above, in a region of the aircraft where laminar flow control is not being attempted.

In accordance with further aspects of this invention, the plurality of small holes in the transpiration panel are of a diameter between 0.005 to 0.020 inches, spaced roughly 0.020 to 0.080 inches apart.

In accordance with yet further aspects of this invention, the holes have an aft-directed pitch angle of roughly between 0 and 45 degrees.

In accordance with other aspects of this invention, the aircraft boundary layer flow control system also includes a suction surface having a plurality of perforations through which suction air is drawn; a compressor for drawing suction air through the perforations and compressing the drawn air; internal ducts connecting the suction surface to the compressor; and passages connecting the compressor output compressed suction air to the transpiration panel.

In accordance with still further aspects of this invention, the aircraft is a subsonic aircraft and the transpiration panel is located on the underside of the wing, such as between a Kruger flap cavity and the front spar of the wing.

In accordance with alternative aspects of this invention, the aircraft is a supersonic aircraft and the transpiration panel is located in the turbulent wedge zone on the upper surface of the wing of the aircraft at roughly mid-chord, near the fuselage, and extending a predetermined distance forward. In many supersonic aircraft this is on top of the landing gear bay.

From the foregoing description, it will be appreciated that a boundary layer flow control system, and in particular a laminar flow control system, formed in accordance with the present invention includes a transpiration panel that provides a new, and distinctly more efficient, method for discharging suction air. More specifically, replacing a conventional discharge nozzle with a transpiration panel reduces the compressor power requirement, because the compression ratio required to compress suction air for discharge through a transpiration panel located in a region where no laminarization is being attempted is less than the compression ratio required to compress air to be expelled via a conventional discharge nozzle.

Replacing a conventional discharge nozzle with a transpiration panel also results in a reduction in the associated weight and volume requirements of an aircraft laminar flow control system. Further, the reduction in compression ratio reduces the discharge suction air temperature, thereby eliminating the need for high temperature materials and thermal insulation. Because the transpiration panel of the present invention can be located closer to the compressor, the length of passages connecting the compressor with the transpiration panel can also be reduced. Lastly, the elimination of the discharge nozzle eliminates associated drag-due-to-volume and nozzle base drag.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a schematic side view of an example of a conventional subsonic aircraft laminar flow control system;

FIG. 2 is a schematic plan view of an example of a conventional supersonic aircraft laminar flow control system of a supersonic aircraft;

DETAILED DESCRIPTION OF THE PREFERRED EMBODIMENT

Although the detailed description is presented with reference to laminar flow control systems, it is to be understood that other boundary layer flow control systems may benefit from use of the present invention. Therefore, even though the present invention was developed for, and is described herein relative to, a laminar flow control system, the present invention encompasses use in other boundary layer flow control applications.

As will be better understood from the following description, the invention is directed to improving the laminar flow control systems of both subsonic and supersonic aircraft. In essence, the invention involves replacing the discharge nozzle of prior art laminar flow control systems with a transpiration panel located in a portion of the skin of the aircraft where laminar flow is not being attempted.

Figure 4:
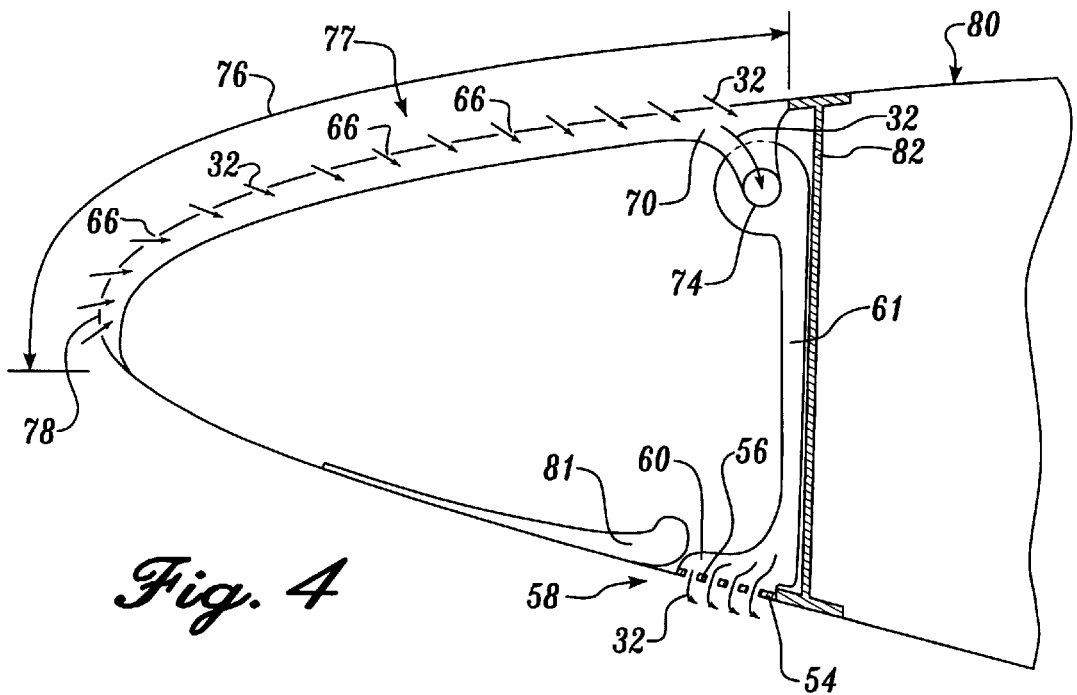
FIG. 4 is a schematic side view of a subsonic aircraft laminar flow control system formed in accordance with the present invention, including the transpiration panel of FIG. 3.
Figure 5:
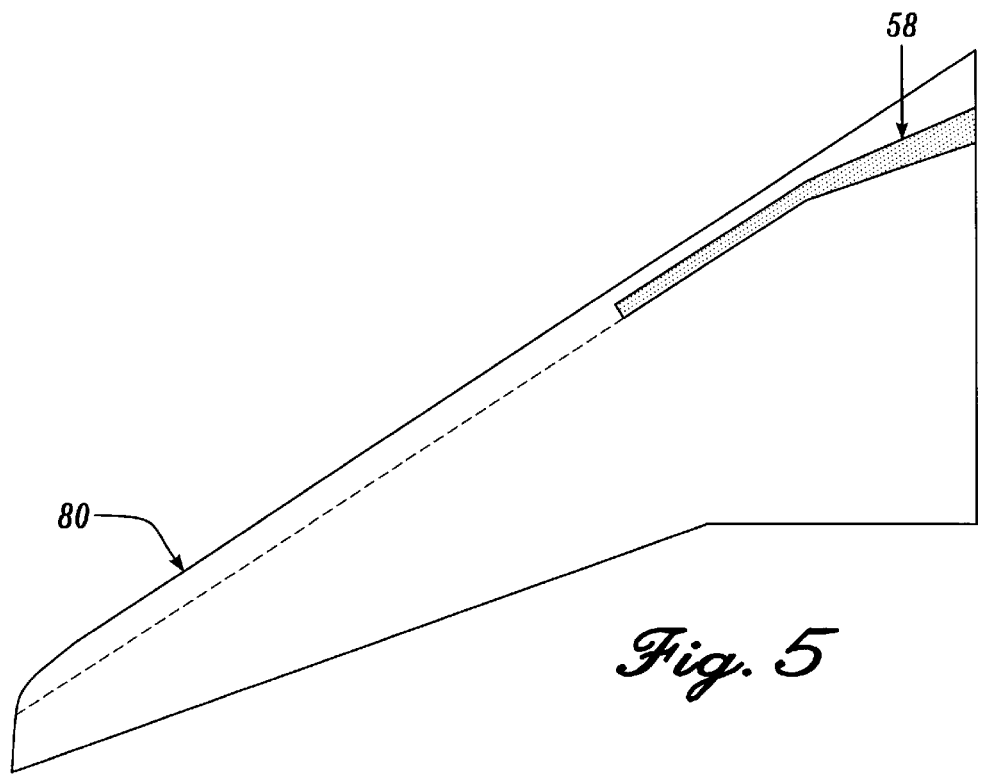
FIG. 5 is a schematic plan view of the underside of the wing of a subsonic aircraft including a laminar flow control system formed in accordance with the present invention.
Figure 6:
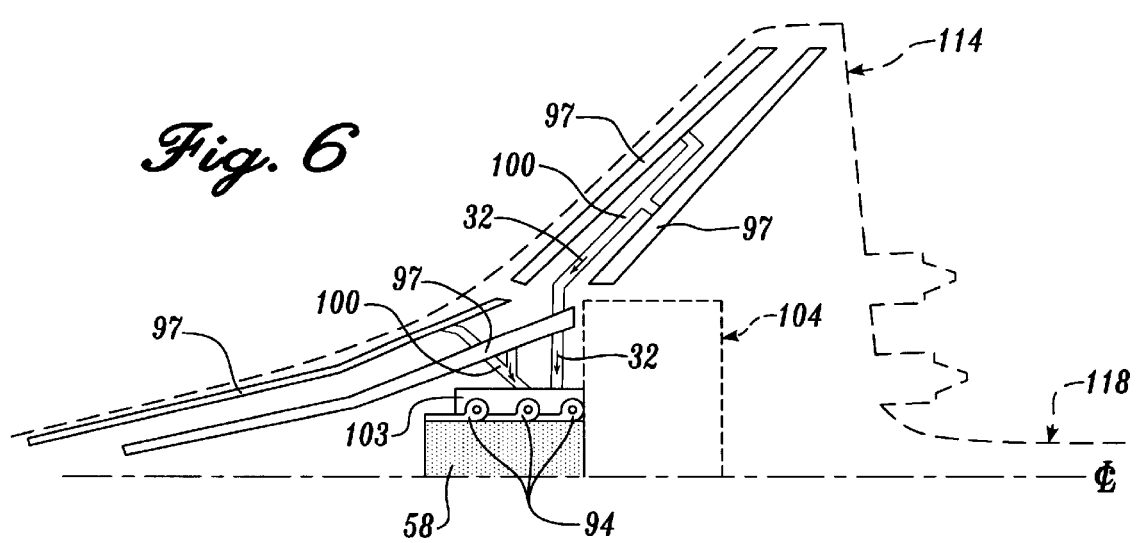
FIG. 6 is a schematic plan view of a supersonic aircraft laminar flow control system formed in accordance with the present invention including the transpiration panel of FIG. 3.

In order to better understand the invention, prior to describing the invention, a description of conventional subsonic and supersonic laminar flow control systems, depicted in FIGS. 1 and 2, respectively, is provided. This is followed by a detailed description of a transpiration panel formed according to the present invention. See FIG. 3. Lastly, exemplary subsonic and supersonic laminar flow control systems, each including a transpiration panel and each formed according to the present invention are described. FIGS. 4 and 5 show the exemplary subsonic laminar flow control system. FIG. 6 shows the exemplary supersonic laminar flow control system.

FIG. 1 is a schematic side view of an example conventional subsonic aircraft laminar flow control system. A flow control region 16 starts at a point just below the leading edge 18 of the wing 20, extends around the leading edge of the wing 20, and ends at the front spar 22. The flow control region 16 of the outer surface of the wings include a suction region 17 that is generally smooth except for a plurality of perforations 26. A series of ducts 28 and 30 couple the perforations 26 to a compressor 24. Thus, the compressor draws, or sucks, air through the perforations 26. The direction of air flow is shown by arrows 32. A discharge nozzle 10, connected to the output of the compressor 24, is mounted beneath the wing 20 and is oriented to discharge compressed suction air aftward. The discharge nozzle 10 is shown as located near the trailing edge 12 of the strut 14 that supports the engine 15 of the aircraft, under the wing 20.

FIG. 2 is a schematic plan view of an example conventional supersonic aircraft laminar flow control system. The outline of a supersonic wing 34 and portions of a fuselage 38 are shown in phantom. As with the conventional subsonic aircraft flow control system shown in FIG. 1, flow control regions 36 are located on the supersonic wing 34. The flow control regions are defined by a plurality of suction regions 37. The suction regions 37 may be located on the upper surface of the wing 34, the lower surface, or both surfaces. The suction regions 37 are generally flush with the outer wing surface and smooth except for a plurality of perforations similar to those shown in FIG. 1 (perforations not shown in FIG. 2).

Still referring to FIG. 2, a plurality of ducts 50 connect the perforations of the suction regions 37 with a compressor 44 located in the wingbox 55 (shown in phantom in FIG. 2), near the fuselage 38. Thus, the compressor 44 draws air from the perforations through the ducts 50 to the compressor 44. The compressor compresses the suction air and exhausts the compressed air aftward via a discharge nozzle 40. The discharge nozzle 40 is located near the fuselage 38, aft of the trailing edge 42 of the wing 34.

As will be readily understood by those skilled in the art related to aircraft flow control systems, the compressor, suction surfaces, perforations, internal ducting, and discharge nozzle of FIGS. 1 and 2 are basically the same components, though, the capacity and location of these elements varies from one aircraft application to another. For example, the compressor 44 selected for use in the conventional supersonic aircraft laminar control system shown in FIG. 2 is of a size and capacity suitable for supersonic use, whereas the size and capacity of the compressor 24 used in the conventional subsonic aircraft laminar flow control system shown in FIG. 1 is suitable for subsonic use.

As to the size and capacity of the compressor, ducts, perforation, etc., of the present invention, these features are not set forth here because the novelty of the present invention lies not in the conventional elements of the system—the compressor, perforations, ducting, etc., but rather in the inclusion of a transpiration panel in an aircraft laminar flow control system in lieu of a discharge nozzle.

While the size and capacity of these conventional elements will change in boundary layer flow control systems formed in accordance with this invention, incorporation of a transpiration panel required that factors be considered (e.g., desired mass flow rate, compression ratio, etc.) that are well known to those skilled in the art of aircraft flow control systems, except where noted herein.

Figure 3:
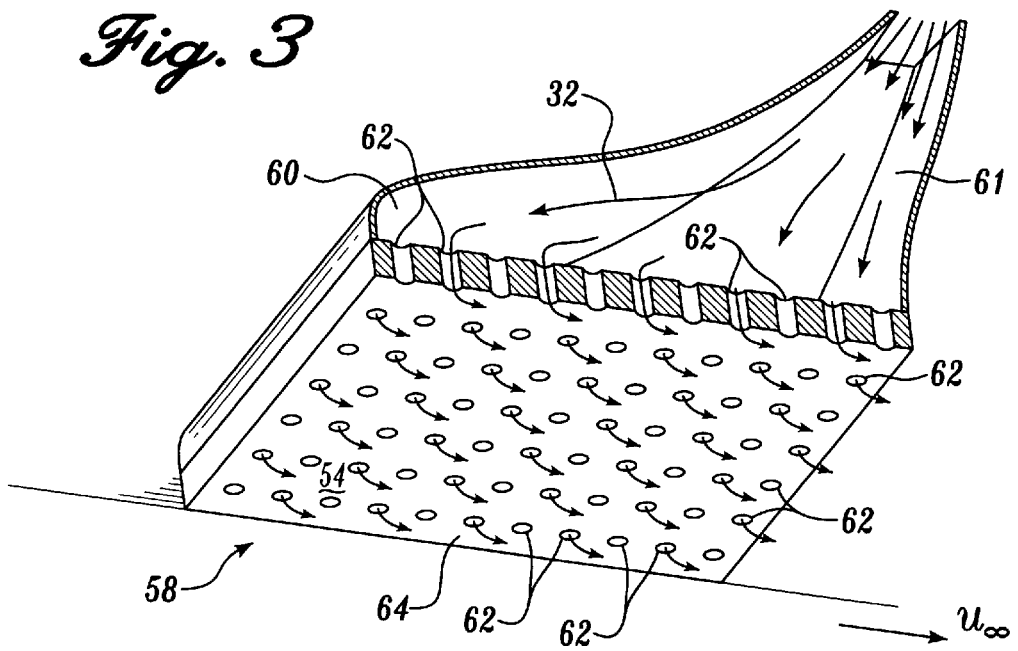
FIG. 3 is a perspective cutaway view of a transpiration panel formed in accordance with the present invention.

FIG. 3 is a perspective cutaway view of a transpiration panel 58 formed in accordance with the present invention. As noted above, the transpiration panel 58 replaces the discharge nozzle of prior art aircraft laminar flow control systems. The transpiration panel 58 illustrated in FIG. 3 is a rigid panel having a plurality of small holes 62 extending from the panel's inner surface 56 (shown in FIG. 4) to the panel's smooth outer surface 54. The transpiration panel 58 forms the end of a plenum 60 located at the end of a duct 61 that is connected to the outlet of the system compressor.

The overall dimensions of the transpiration panel 58 and the number of panels required, will depend upon the design of the aircraft with which the invention is to be used. At present, the preferred thickness of the transpiration panel 58 is between 0.040 and 0.060 inches. Preferably, the small holes 62 are spaced approximately 0.020 to 0.080 inches apart. The value of the small hole diameter is preferably between 0.005 and 0.020 inches. The plurality of small holes 62 may also be slanted from the inner surface 56 of the rigid panel to the outer surface 54 in an aft direction relative to the longitudinal axis of the aircraft, the pitch angle preferably being in the range of approximately 0 to 45 degrees. Whether slanting of the holes is used will depend on the particular application and the desired results. As will be readily appreciated by those skilled in this art and others, the foregoing dimensions should be taken as exemplary, not limiting, since any of the above values may vary depending on the requirements of a particular application.

FIGS. 4 and 5 are schematic views of a subsonic aircraft laminar flow control system including a transpiration panel 58 formed in accordance with the present invention. FIG. 4 is generally similar to the conventional subsonic aircraft laminar flow control system described above and shown in FIG. 1. Like FIG. 1, FIG. 4 includes a flow control region 76 that extends from just below the leading edge 78 of a wing 80, around the leading edge, and to a front spar 82. The flow control region 76 of the outer surface of the wing 80 includes a suction region 77 that is generally smooth except for a plurality of perforations 66 therethrough.

A compressor 74 draws air from the perforations 66 through various ducts 70 located in the leading edge structure of the subsonic wing 80. The direction of air flow is shown by arrows 32. The compressor 74 is preferably located in the subsonic wing 80 near the wing's leading edge. For example, as shown in FIG. 4, the compressor 74 may be mounted just forward of the front spar 82 facing the leading edge 78 of the wing 80. Obviously, the compressor 74 may be located in other places in the aircraft, depending on the available space.

With respect to size, the compressor 74 for the subsonic application should be preferably selected such that the coefficient of transpiration mass flux, $C_q$, falls within the range of 0.003 to 0.005. The coefficient of transpiration mass flux is calculated using the following equation:

$$C_q = \dot{m}''/G_\infty \quad (1)$$

where, transpiration mass flux, $\dot{m}'' = \rho_0 V_0$; $\rho_0$ being local density, $_0$ being local velocity. $G_\infty$ is free stream mass flux ($G_\infty = \rho_\infty V_\infty$).

The transpiration panel 58 of the present invention is connected to the compressor 74 via the plenum 60 and the internal duct 61 shown in FIG. 3 and described above. Although the duct 61 is shown located forward of the front spar 82, the duct 61 may also be located in other areas of the wing 80 depending upon the position of the compressor 74 and other design criteria. The transpiration panel 58 releases compressed suction air aftward.

The preferred location of the transpiration panel 58 for a subsonic aircraft wing 80, is shown in FIGS. 4 and 5. As shown, the transpiration panel 58 is preferably located on the underside of the wing 80, between the cavity in which a Kruger flap 81 is stored and the front spar 82. Alternatively, the transpiration panel 58 may be located in other aircraft areas. The important consideration in panel location is that the outer surface 54 of the panel 58 be flush with an exterior aircraft surface and at a location on the aircraft where no laminarization is being attempted.

In operation, the compressor 74 draws air from the leading edge of the wing 80, through the perforations 66, compresses the suction air and sends the compressed air to the transpiration panel 58, where the compressed air is transpired aftward into free stream non-laminar flow via the small holes 62 in the transpiration panel 58. See FIG. 3.

FIG. 6 is a schematic plan view of a supersonic aircraft laminar flow control system including a transpiration panel 58 formed in accordance with the present invention. The outline of a supersonic wing 114 and portions of a fuselage 118 are shown in phantom. The laminar flow control system shown in FIG. 6 includes the transpiration panel 58 described above. As also described above, the transpiration panel is rigid and smooth except for a plurality of small holes 62 extending from the panel's inner surface 56 to the panel's smooth outer surface 54.

The remaining elements of the laminar flow control system shown in FIG. 6 are substantially the same as those shown in FIG. 2. More specifically, the laminar flow control system includes perforated suction regions 97 located on the leading edge and mid-chord surfaces of the wing 114. As with FIG. 2, suction regions 97 of FIG. 6 may be located on the upper surface of the supersonic wing 114, the lower surface, or both surfaces. The suction regions 97 are generally smooth and positioned flush with the adjacent exterior surface of the wing 114. The suction regions 97 include a plurality of perforations similar to those shown in FIG. 4 (perforations not shown in FIG. 6).

Internal ducts 100 connect the perforations of the suction regions 97 to one or more compressors 94. Although the ducts 100 are shown in specific locations in FIG. 6, they may be located in other areas of the wing 114 in order to maximize the use of space. Thus, the placement of the ducts 100 is not particularly important to the present invention. The compressors 94 are preferably located in one or more dry bays 103 located next to the landing gear bay 104 of the supersonic aircraft, ahead of the main spar box (not shown). As with the ducts 100, the compressors 94 may be located in other available places in the aircraft, as determined by a specific application and factors well known to those skilled in the art.

The compressors 94 draw air from the perforations in the suction regions 97, through the internal ducts 100. The compressors 94 compress the suction air and output the compressed air to the plenum (not shown) enclosed by the transpiration panel. Preferably, the selected compressors 94 will compress the air such that the coefficient of transpiration mass flux, $C_q$ (defined above) falls within the range of approximately 0.003 to 0.005.

Still referring to FIG. 6, the transpiration panel 58 transpires the compressed air in a distributed manner through the small holes 62 into the free stream of the boundary layer over the wing 114. Preferably, the transpiration panel 58 is located on the upper surface of the supersonic wing 114 near the fuselage 118 at roughly mid-chord, on top of the landing gear bay 104. The transpiration panel extends a predetermined distance forward from the landing gear bay. This location is preferable because it is part of the turbulent wedge zone, i.e., the upper surface area of a supersonic wing near the fuselage where the boundary layer is turbulent.

While preferred embodiments of the invention have been illustrated and described, it will be appreciated that various changes can be made therein without departing from the spirit and scope of the invention. Examples of such changes include the size, number, and location of transpiration panels on the aircraft; the overall suction capacity of the air suction system; and the placement of the various components. Hence, within the scope of the appended claims, it is to be understood that the invention can be practiced otherwise than as specifically described herein.

The embodiments of the invention in which an exclusive property or privilege is claimed are defined as follows:

1. In a boundary layer flow control system for an aircraft including a perforated suction region, a compressor, and inlet ducting for passing suction air from the suction region to the compressor, the improvement comprising a transpiration panel coupled to the output of the compressor, the transpiration panel being located in a surface of the aircraft other than an aircraft wing outboard chordwise surface, in regions where aerodynamic flow control is not being sought, the transpiration panel for receiving compressed suction air from the compressor and transpiring the compressed suction air from the aircraft, the transpiration panel including a plurality of holes.

2. The improvement according to claim 1, wherein the aircraft is a subsonic aircraft and the transpiration panel is located on the underside of a wing in a turbulent flow region near the wing leading edge.

3. The improvement according to claim 1, wherein the aircraft is a supersonic aircraft and the transpiration panel is located on the upper surface of a wing in a turbulent flow region near the fuselage.

4. The improvement according to claim 1, wherein the transpiration panel comprises a rigid panel having a plurality of small holes extending from an inner transpiration panel surface to a smooth outer transpiration panel surface.

5. The improvement according to claim 4, wherein the plurality of small holes are angled through the transpiration panel in an aft direction relative to the longitudinal axis of the aircraft, at a pitch angle having a value between roughly 0 to 45 degrees.

6. The improvement according to claim 4, wherein the each of the plurality of small holes have a diameter between roughly 0.005 to 0.020 inches.

7. The improvement according to claim 4, wherein the plurality of small holes are of a number approximately 150 to 2500 per square inch of outer surface area of the rigid panel.

8. A transpiration panel according to claim 4, wherein the rigid panel is roughly between 0.040 and 0.060 inches thick.

9. A laminar flow control suction system according to claim 1, wherein the transpiration panel is located in a non-laminar air flow region.

10. A laminar flow control system for an aircraft having a fuselage and a wing, the wing including a leading edge, the system comprising:
    (a) a suction region located on an aerodynamic surface of an aircraft, the suction region including a plurality of perforations through which suction air is drawn into the aircraft;
    (b) a compressor for drawing in the suction air and compressing the suction air, the compressor having an input and an output;
    (c) input ducting for connecting the perforations in the suction region to the input of the compressor; and
    (d) a transpiration panel connected to the output of the compressor, the transpiration panel including a plurality of small holes and an outer surface, the transpiration panel outer surface being located flush with external surfaces of the aircraft; the transpiration panel being located in a region where aerodynamic flow control is not being sought such as at least one of the wing near the fuselage, an undersurface of the wing near the wing leading edge, and the fuselage.

11. A laminar flow control system according to claim 10, wherein: (i) the aircraft is a subsonic aircraft; (ii) the suction region is located on an upper surface of a wing of the aircraft near a leading edge of the wing; and (iii) the transpiration panel is located on the underside of the wing near the leading edge of the wing.

12. A laminar flow control suction system according to claim 10, wherein (i) the aircraft is a supersonic aircraft; (ii) the suction region is located on an upper surface of a wing near a leading edge of the wing; and (iii) the transpiration panel is located on the upper surface of the wing near the fuselage.

13. A laminar flow control suction system according to claim 10, wherein plurality of small holes are angled through the transpiration panel in an aft direction relative to the longitudinal axis of the aircraft, the pitch angle having a value between roughly 0 to 45 degrees.

14. A laminar flow control suction system according to claim 10, wherein the transpiration panel outer surface is located in a non-laminar flow region of the external aircraft surface.

15. A method of boundary layer flow control for an aerospace vehicle comprising:
   (a) suctioning air from an aerodynamic surface of an aerospace vehicle;
   (b) compressing the suction air; and
   (c) emitting the suction air from the vehicle through a transpiration panel having a plurality of small holes and located in a region where aerodynamic flow control is not being sought.

16. A method of discharging suction air according to claim 15, wherein the plurality of small holes are directed aftward so that the suction air is emitted aftward from the vehicle.

17. A method of discharging suction air according to claim 15, wherein the boundary layer is a laminar boundary layer and the aerospace vehicle is a subsonic airplane.

18. A method of discharging suction air according to claim 17, wherein the transpiration panel outer surface is located in a non-laminar flow region.

19. A method of discharging suction air according to claim 15, wherein the boundary layer is a laminar boundary layer and the aerospace vehicle is a supersonic airplane.

20. A method of discharging suction air according to claim 19, wherein the transpiration panel outer surface is located in a non-laminar flow region.

\* \* \* \* \*

UNITED STATES PATENT AND TRADEMARK OFFICE
CERTIFICATE OF CORRECTION

PATENT NO. : 5,772,156
DATED : June 30, 1998
INVENTOR(S) : P.G. Parikh et al.

It is certified that error appears in the above-identified patent and that said Letters Patent is hereby corrected as shown below:

| COLUMN | LINE | |
|---|---|---|
| 8 (Claim 6, | 23 line 1) | after "wherein" delete "the" |
| 8 (Claim 6, | 24 line 2) | "have" should read --has-- |
| 8 (Claim 7, | 27 line 2) | "are" should read --is-- |
| 8 (Claim 10, | 53 line 19) | "wing" should read --wings-- |
| 9 (Claim 13, | 2 line 2) | after "wherein" insert --the-- |

Signed and Sealed this

Twenty-ninth Day of December, 1998

Attest:

Attesting Officer

BRUCE LEHMAN

Commissioner of Patents and Trademarks